United States Patent [19]

Bortner

[11] Patent Number: 4,614,364

[45] Date of Patent: Sep. 30, 1986

[54] FREE STANDING INSERT WITH COUPON FLAPS

[76] Inventor: Allen A. Bortner, 34 Edgemere Dr., Searingtown, N.Y. 11507

[21] Appl. No.: 684,625

[22] Filed: Dec. 21, 1984

[51] Int. Cl.⁴ .......................... G09B 1/16; B42D 3/12; B42D 15/00; B42D 3/04

[52] U.S. Cl. .......................................... 283/45; 283/17; 283/63 R; 281/34

[58] Field of Search .................... 283/51, 56, 63 R, 45; 281/3 R, 15 R, 17, 19 A, 19 R, 34, 35; 229/70; 412/4, 24

[56] References Cited

U.S. PATENT DOCUMENTS

| | | | |
|---|---|---|---|
| 780,867 | 1/1905 | Davidson | 283/63 R |
| 2,131,448 | 9/1938 | Lowen | 283/56 |
| 2,309,244 | 1/1943 | Fey | 283/63 R |
| 3,021,156 | 2/1962 | Coilot | 281/17 |
| 3,520,560 | 7/1970 | Isaac | 283/56 |
| 3,760,520 | 9/1973 | Hamilton | 283/63 R |
| 3,922,743 | 12/1975 | Schuler et al. | 412/24 |
| 4,305,605 | 12/1981 | Vine | 283/56 |

*Primary Examiner*—Paul A. Bell
*Assistant Examiner*—Paul M. Heyrana, Sr.
*Attorney, Agent, or Firm*—Brumbaugh, Graves, Donohue & Raymond

[57] ABSTRACT

An advertising insert cover having a rectangular sheet folded in two to form rectangular front and back portions, attached to which are inwardly folded flap portions extending partway over the inner side of its associated cover portion for retaining loose, free standing inserts within the cover. The flap portions contain slit tear lines extending perpendicularly to the outer edge of the front and back portions and forming segments of detachable coupons. In another embodiment, the flaps are omitted and the coupon segments are formed along the outer edges of the front and/or back portions.

7 Claims, 2 Drawing Figures

FREE STANDING INSERT WITH COUPON FLAPS

BACKGROUND OF THE INVENTION

The present invention relates to advertising inserts for newspapers, magazines, and the like and, more particularly to such inserts having detachable coupon-bearing flaps.

Advertising supplements, such as of the type often found in Sunday newspapers and commonly known in the trade as free standing inserts, generally consist of an outer folded sheet and one or more single or double folded sheets, loosely retained between the folds of the outer sheets. Typically, each of the sheets of the insert includes advertising material and coupons for mail order purchases or discounts, and the like. To insure economic effectiveness of this type of advertising, it is important that the inserts be inexpensively produced, and that the several sheets of each insert remain together to insure that the advertising material reaches the newspaper or magazine purchaser. It is also important that the coupons included with the advertising material in the insert be readily separable from the sheets on which they are printed, so that minimal effort is required of the reader to make use of the coupons.

Present forms of advertising inserts fall short of achieving these objectives. Modern high-speed presses enable good quality printing to be achieved on relatively inexpensive paper stock but subject the paper web moving through the presses to high tensile forces. If coupons included in such inserts are provided with deeply embedded transverse perforated tear lines to permit ready separation by the consumer, the web would not withstand the tensions to which it is subjected in the printing process and would tear. Moreover, known perforation systems, which are designed to punch lines of small round holes in the paper, cannot operate effectively in the high speed production environment described. Often, the holes are imperfectly punched, leading to mutilation of the coupons, rather than a clean tear. Perhaps more importantly, the punching process produces a substantial quantity of tiny paper bits (sometimes referred to as "chad"), that must be continuously removed from the production site, a difficult task in modern, high speed printing and assembly systems. To avoid this problem, perforation lines for such coupons are seldom used in free standing inserts and the consumer is left to the use of scissors or tearing to remove the coupons.

Similarly, the problem of securing the several sheets of the insert together cannot be solved by stapling or other known fastening techniques, because they are economically infeasible.

One form of insert which reflects the shortcomings of known inserts is shown in U.S. Pat. No. 3,520,560 to Isaac. The insert of the patent is stapled into a magazine, and includes a plurality of coupons formed along one edge of one side of the folded insert sheet. These coupons are attached to the edge of the advertising sheet by a perforated line, but in the direction perpendicular to the perforated line are, in one embodiment, entirely separated from each other, and in another embodiment separated from each other over all of their lengths except for a minimal portion at the outer edges. Because of the transverse perforated lines separating the coupons from the rest of the sheet, the insert of the Isaac patent is not adaptable to production by modern, high-speed and economical methods, as described above.

SUMMARY OF THE INVENTION

It is the primary object of the present invention to provide a free standing insert cover arrangement which includes a plurality of coupons easily severable from the cover sheets without the aid of scissors or knives and which can be economically produced on high-speed modern printing equipment. It is a further object of the invention to provide such a cover arrangement which can securely retain a plurality of advertising sheets without staples or other fastening means.

These objects are achieved, in accordance with the present invention, by providing an outer cover for the insert sheets which consists of a rectangular sheet of paper or like material, on which advertising copy may be imprinted, and which is folded in two to provide front and back cover panels. The outer edge of one or both of the panels is formed with a plurality of severable segments, suitable for coupons, separated by tear lines extending perpendicularly from the edge and towards the fold, each of the tear lines consisting of a series of colinear slits separated by short uncut sections. In a particular embodiment, a relatively narrow flap is formed in one or both of the panels by inwardly folding the sheet substantially parallel to the edge and the coupon segments are provided in the flap. With the flap sharply creased, loose insert sheets may be securely retained within the cover beneath the flap.

Preferably, each of the tear lines consists of a series of colinear slits separated by short uncut sections. Such slit lines are die cut in the printing process and provide clean discontinuities along the tear line without objectionable waste particles. Thus, each of the coupons may be quickly and neatly separated from each other by tearing along the slit line to the flap crease.

As compared with conventional perforations, the slit tear line of the invention results in less weakening of the paper and thus, a slit tear line transverse to the movement of a paper web through a high-speed printing press is better able to withstand the tensile forces to which it is subjected without tearing. Thus, the interior ends of the coupon segments may be provided with slit tear lines perpendicular to the tear lines separating the segments, to facilitate removal of the coupons. In the folded flap embodiment, the sharpness of the crease ordinarily will enable precise separation of the coupon without slits, but, if desired, a slit tear line may be provided along the crease as well.

Accordingly, the invention enables secure retention of loose insert sheets within the cover, provides readily separable coupons, and enables the economies provided by high-speed modern printing presses to be realized.

BRIEF DESCRIPTION OF THE DRAWINGS

The foregoing, and other objects, features and advantages of the invention will be more clearly understood from the following description taken in conjunction with the accompanying drawings in which.

DETAILED DESCRIPTION OF THE INVENTION

Figure 1:
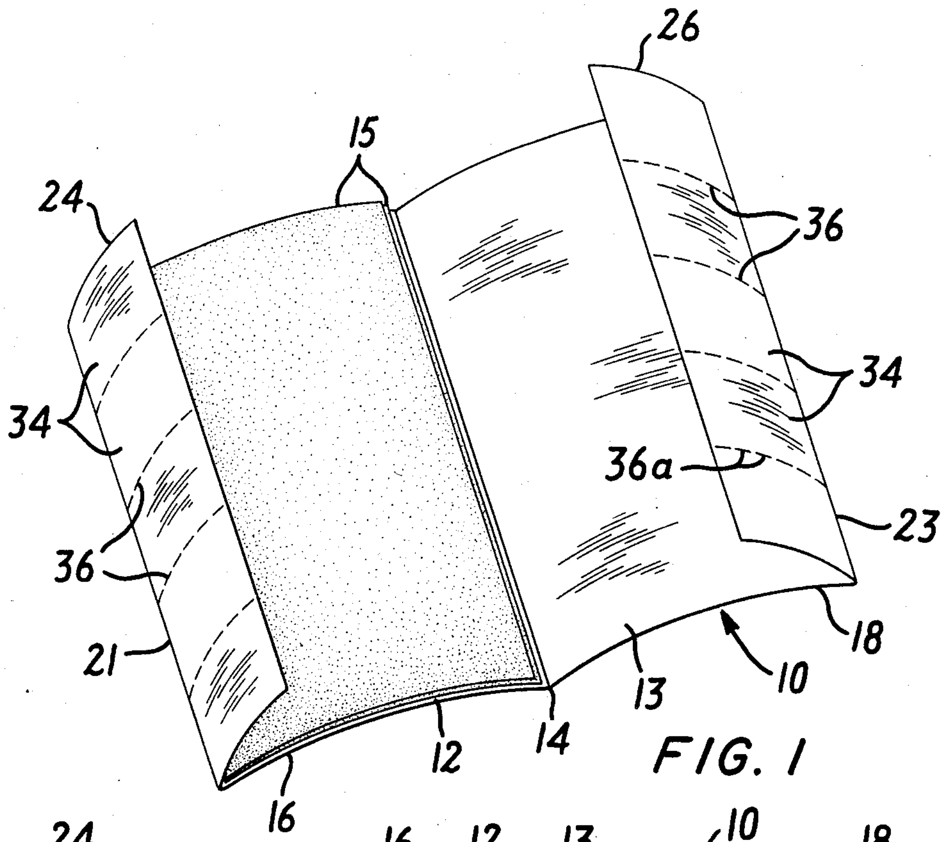
FIG. 1 is a pictorial view of the insert of the invention, showing the cover open and loose insert sheets retained within a flap.

Referring to the drawings, the cover 10 may be formed of any suitable sheet material, such as paper, capable of being imprinted with advertising copy on modern high-speed printing machinery. It will be understood that a continuous stream of covers will be printed on a web of paper travelling in the direction shown by the arrow in FIG. 2, through the printing press and subsequently, automatically cut and folded to form the individual covers. Advertising material (not shown) may be included on all four sides of the cover or on the outer surfaces, as desired.

The cover 10 is folded in two to create a sharp fold 14. Preferably, the fold 14 is at the center of the rectangular sheet to form equal front and back cover portions 16 and 18. If desired, however, the front and back covers can be unequal in size.

Along the outer edges 20 and 22 of the cover portions are formed inwardly folded flaps 24 and 26 respectively. The flaps are formed by folding an outer strip of each of the cover portions inwardly towards the fold 14, producing sharp creases 21 and 23. As seen best in FIG. 1, the flaps 24 and 26 extend inwardly only part way towards the fold 14. Preferably, this distance is one-fourth to one-third of the distance to the fold 14.

Figure 2:
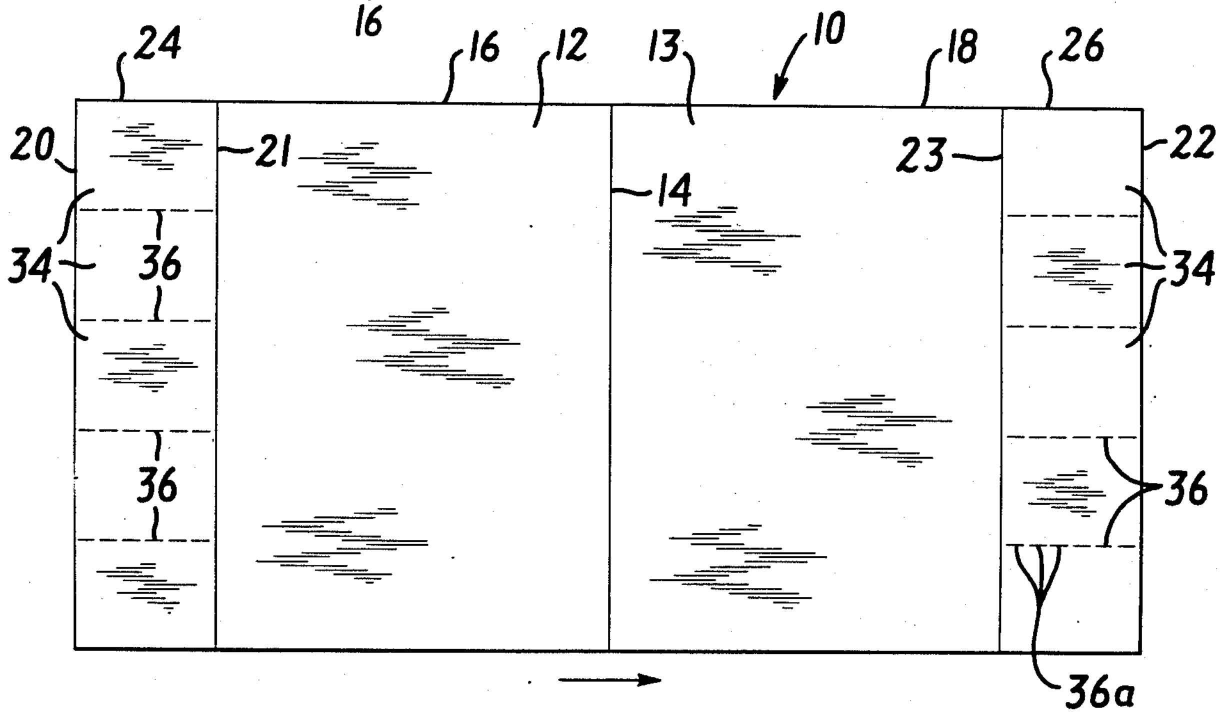
FIG. 2 is a plan view of the insert cover of the invention.

Each of the flaps 24 and 26 are divided (horizontally as seen in FIG. 2) into a plurality of segments 34, separated from each other by tear lines 36, each such line preferably consisting of a plurality of colinear slits 36*a*, separated by short, uncut sections. The segments 34 may be separated manually from each other simply by tearing along the slit lines 36, and then along the sharp crease 21 or 23, insuring against accidental mutilation of the coupons, without requiring the use of cutting tools. The creases 21, 23, which are formed after the printing and slitting processes are completed, may be uncut, i.e., without slits or perforations on the like, since the sharpness of the folds enables precise tearing without them, or provided with a slit tear line, if desired.

As seen in FIG. 1, loose insert sheets 15 may be slipped within the cover beneath the flaps 24 and 26, and when inserted in the newspaper or magazine will be firmly secured within the cover 10. Although single sheets 15 are shown only on one side of the insert cover 10 of FIG. 1, it will be understood that additional single sheets may be inserted under the flap 26 and folded sheets may also be inserted with their outer edges secured by both of the flaps 24 and 26.

Although the embodiment illustrated in FIG. 1 and described above includes folded flaps, the advantages provided by the slit tear line of the invention may be realized without providing flaps on the cover 10. In such an embodiment, the edges of the cover portions 12 and 13 would not be creased along lines 21 and 23 respectively, but would have the plurality of segments 34 formed along the outer edges with the slit tear lines 36 extending perpendicularly from the edge towards the fold 14. The lines 21 and 23, in this embodiment, represent the lines at which the tear lines 36 terminate. If desired, slits may be provided therealong to provide tear lines perpendicular to the tear lines 36.

While there has been described and shown the preferred embodiment of the present invention, it will be recognized by those skilled in the art that various modifications may be made thereto without departing from the spirit of the invention. For example, the insert cover may be formed with a flap on but one of the cover portions, and the angles of the folds and tear lines may be modified to provide different shapes. Accordingly, the invention is to be limited only as defined by the appended claims.

I claim:

1. An advertising insert cover comprising a rectangular sheet of material adapted to be imprinted with advertising copy, said sheet being folded in two to form rectangular front and back cover portions meeting at a fold, at least one of said cover portions being formed with a plurality of segments along its outer edge, said segments being separated from each other by tear lines extending perpendicularly to said outer edge, and said segments being connected to said cover portions along an uncut line extending parallel to said fold.

2. The advertising insert of claim 1 wherein each of said tear lines is formed of a plurality of colinear slits through the material of said sheet, said slits being separated from each other by short uncut sections.

3. An advertising insert cover comprising a rectangular sheet of material adapted to be imprinted with advertising copy, said sheet being folded in two to form rectangular front and back cover portions meeting at a fold, and an inwardly folded flap formed along the outer edge of at least one of said front and back cover portions, said flap being sharply creased with respect to its associated cover portion and extending partway over the inner side of said associated cover portion towards the fold between said cover portions for retaining loose sheets within said cover, said crease being uncut along its entire length, and said flap being divided into a plurality of segments adapted to be selectively separated from each other and said associated cover portion.

4. The advertising insert cover of claim 3 wherein one of said inwardly folded flaps is formed along the outer edge of each of said front and back cover portions.

5. The advertising insert cover of claim 3 wherein said segments of said flap are divided from each other by tear lines extending perpendicularly to the outer edge of said front and back cover portions from said outer edge to the crease between said flap and its associated cover portion.

6. The advertising insert cover of claim 4 wherein said segments of each of said flaps are divided from each other by tear lines extending perpendicularly to the outer edge of said front and back cover portions from said outer edge to the crease between said flap and its associated cover portion.

7. The advertising insert cover of claims 5 or 6 wherein each of said tear lines is formed of a plurality of colinear slits through the material of said flap, said slits being separated from each other by short uncut sections.

* * * * *